United States Patent
Schmidt et al.

(10) Patent No.: US 12,358,416 B2
(45) Date of Patent: Jul. 15, 2025

(54) METHOD FOR ILLUMINATING VEHICLE SURROUNDINGS, AND MOTOR VEHICLE

(71) Applicant: AUDI AG, Ingolstadt (DE)

(72) Inventors: Valentin Schmidt, Neuburg an der Donau (DE); Tilman Armbruster, Ingolstadt (DE); Johannes Reim, Ingolstadt (DE); Marcel Debelec, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 282 days.

(21) Appl. No.: 17/792,973

(22) PCT Filed: Dec. 11, 2020

(86) PCT No.: PCT/EP2020/085691
§ 371 (c)(1),
(2) Date: Jul. 14, 2022

(87) PCT Pub. No.: WO2021/148196
PCT Pub. Date: Jul. 29, 2021

(65) Prior Publication Data
US 2023/0046242 A1 Feb. 16, 2023

(30) Foreign Application Priority Data

Jan. 24, 2020 (DE) .................. 10 2020 101 710.3

(51) Int. Cl.
*B60Q 1/04* (2006.01)
*B60G 17/0165* (2006.01)
(Continued)

(52) U.S. Cl.
CPC ........... *B60Q 1/04* (2013.01); *B60G 17/0165* (2013.01); *G06V 10/141* (2022.01); *G06V 10/145* (2022.01); *G06V 20/58* (2022.01)

(58) Field of Classification Search
CPC ............ G01B 11/2518; G01B 11/2513; G01B 11/306; G06V 20/56; G06V 20/584;
(Continued)

(56) References Cited

U.S. PATENT DOCUMENTS

| | | | |
|---|---|---|---|
| 10,632,899 B2 | 4/2020 | Neukam | |
| 10,719,723 B2 * | 7/2020 | Schamp | ............... G06V 10/145 |

(Continued)

FOREIGN PATENT DOCUMENTS

| | | |
|---|---|---|
| CN | 102923215 A | 2/2013 |
| DE | 4401541 A1 | 7/1994 |

(Continued)

OTHER PUBLICATIONS

International Preliminary Report on Patentability directed to related International Patent Application No. PCT/EP2020/085691, completed Feb. 21, 2022, with attached English-language translation; 13 pages.

(Continued)

*Primary Examiner* — Andrew M Moyer
*Assistant Examiner* — Ahmed A Nasher
(74) *Attorney, Agent, or Firm* — Sterne, Kessler, Goldstein & Fox P.L.L.C.

(57) ABSTRACT

A method for illuminating vehicle surroundings of a motor vehicle that comprises an illumination device and a detection device, wherein the illumination device is set up to illuminate at least part of a solid angle region of the vehicle surroundings with different illumination patterns, in particular with visible light, wherein the illumination patterns each predefine illumination intensities for different solid angle subregions of the solid angle region, comprising the steps of: illuminating the vehicle surroundings with a first of the illumination patterns by means of the illumination device, detecting a light pattern that results from the illumination of (Continued)

the vehicle surroundings with the first illumination pattern by means of the detection device, selecting a second of the illumination patterns on the basis of the detected light pattern, and illuminating the vehicle surroundings with the second illumination pattern by means of the illumination device.

12 Claims, 3 Drawing Sheets

(51) Int. Cl.
*G06V 10/141* (2022.01)
*G06V 10/145* (2022.01)
*G06V 20/58* (2022.01)

(58) Field of Classification Search
CPC .... G06V 10/145; G06V 10/141; G06V 20/58; B60W 2552/35; B60W 50/14; B60Q 1/04; B60Q 2300/054; B60Q 2300/32; B60Q 2300/45; B60Q 2400/50; B60Q 2300/324; B60G 17/0165; B60G 2400/82; B60G 2400/823; B60G 2401/14
See application file for complete search history.

(56) References Cited

U.S. PATENT DOCUMENTS

| | | | |
|---|---|---|---|
| 2008/0015743 A1* | 1/2008 | Haug | B60T 7/22 701/1 |
| 2016/0114720 A1 | 5/2016 | Schlaug et al. | |
| 2016/0368413 A1* | 12/2016 | Nishii | F21S 41/36 |
| 2017/0096144 A1* | 4/2017 | Elie | B60W 30/02 |
| 2018/0143320 A1 | 5/2018 | Steever et al. | |
| 2018/0260636 A1 | 9/2018 | Zou et al. | |
| 2019/0078877 A1* | 3/2019 | Suzuki | G01B 11/303 |
| 2021/0072020 A1 | 3/2021 | Thony | |
| 2024/0288863 A1* | 8/2024 | Strobel | B60W 40/06 |

FOREIGN PATENT DOCUMENTS

| | | |
|---|---|---|
| DE | 19730414 A1 | 1/1999 |
| DE | 102014221647 A1 | 4/2016 |
| DE | 102015200748 A1 | 7/2016 |
| DE | 102015206936 A1 | 10/2016 |
| DE | 102016006390 A1 | 11/2017 |
| DE | 102017119376 A1 | 2/2019 |
| EP | 3100908 A1 | 12/2016 |
| EP | 3113150 A1 | 1/2017 |
| EP | 3398812 A1 | 11/2018 |
| WO | WO 2010114747 A1 | 10/2010 |
| WO | WO 2019/121880 A1 | 6/2019 |

OTHER PUBLICATIONS

International Search Report and Written Opinion of the International Searching Authority directed to related International Patent Application No. PCT/EP2020/085691, mailed Feb. 26, 2021, with attached English-language translation; 19 pages.

* cited by examiner

METHOD FOR ILLUMINATING VEHICLE SURROUNDINGS, AND MOTOR VEHICLE

TECHNICAL FIELD

The present disclosure relates to a method for illuminating vehicle surroundings of a motor vehicle which comprises an illumination device and a detection device. The present disclosure also relates to a motor vehicle.

BACKGROUND

When driving on rough terrain, there may be bumps or obstacles on the road that should not be driven over or should only be driven over with great care. In the dark in particular, corresponding obstacles can hardly be perceived by a driver with conventional illumination by low beam.

Different approaches are known in the prior art for projecting light patterns in a vehicle surrounding and using distortions in the projected light pattern to emphasize bumps for a driver or for the motor vehicle to automatically recognize them. Corresponding approaches are discussed, for example, in DE 10 2015 206 936 A1, DE 197 30 414 A1, and WO 2019/121880 A1. The problem in this case is that clearly different requirements result for a comfortable recognition of bumps by observing a distorted light pattern by a driver himself and for an automatic recognition of bumps. In order to be able to automatically recognize bumps in the vehicle surroundings as well as possible, the illumination should take place with a very fine pattern. However, the extensive illumination of the area in front of the vehicle with a very fine pattern is often perceived as rather annoying by drivers and also makes it difficult for the driver to recognize distortions in the projected pattern or grid.

It is therefore often proposed in the prior art for automated obstacle detection by light projection to use infrared light. However, this can only be used for automatic obstacle detection, since such illumination is not visible to a driver. In addition, an additional illumination device is required, which means that the technical effort involved in implementing such approaches can be higher than when using visible light.

BRIEF DESCRIPTION OF DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

DETAILED DESCRIPTION

Figure 1:
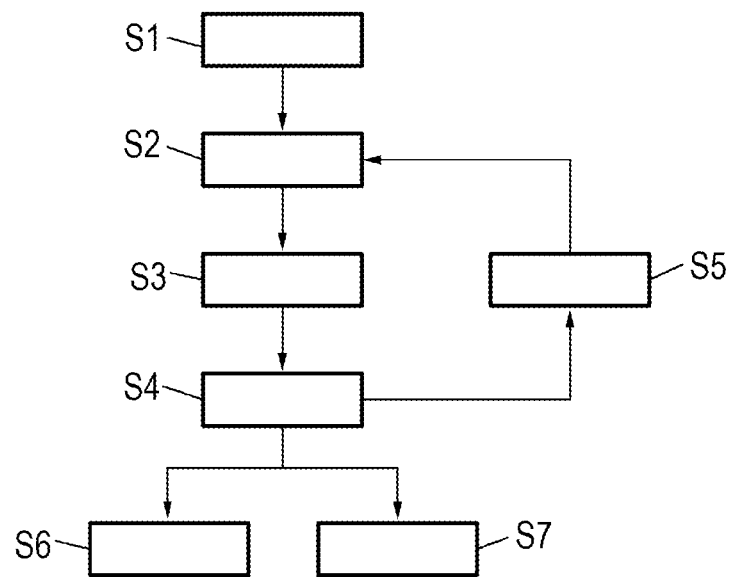
FIG. 1 is a flow diagram of an embodiment of the method according to the present disclosure.

The present disclosure is therefore based on the object of illuminating vehicle surroundings in a way that, on the one hand, it allows a driver to easily identify the surroundings, in particular obstacles and bumps, and, on the other hand, supports automated recognition of obstacles and bumps in the vehicle surroundings.

The object is achieved according to the present disclosure by a method for illuminating vehicle surroundings of a motor vehicle which comprises an illumination device and a detection device, wherein the illumination device is set up to illuminate at least part of a solid angle region of the vehicle surroundings with different illumination patterns, in particular with visible light, wherein the illumination patterns each predefine illumination intensities for different solid angle subregions of the solid angle region, wherein the method comprises the following steps:

illuminating the vehicle surroundings with a first of the illumination patterns by means of the illumination device, detecting a light pattern that results from the illumination of the vehicle surroundings with the first illumination pattern by means of the detection device, selecting a second of the illumination patterns on the basis of the detected light pattern, and illuminating the vehicle surroundings with the second illumination pattern by means of the illumination device.

According to an embodiment, it is proposed that a detected light pattern be taken into account in order to select an illumination pattern that will be used in the future to illuminate the vehicle surrounding. As will be explained in more detail later, the initially detected light pattern can already be used to recognize whether or where relevant bumps or obstacles are located in the vehicle surroundings, for which bumps or obstacles additional information is to be automatically recognized, for example. The second illumination pattern can then be selected in such a way that relevant regions, for example regions that appear to comprise bumps or obstacles, are illuminated in a way that allows good automated evaluation, for example with a finely structured illumination pattern.

A relatively coarse-resolution pattern can be used for other regions, for example, which pattern is well suited to highlighting and clarifying large-area bumps or obstacles for a driver. Taking the detected light pattern into account when selecting the second illumination pattern thus makes it possible to already take into account properties of the vehicle surroundings when selecting the second illumination pattern and thus to select the second illumination pattern in such a way that both a driver and automated image processing can be supplied with relevant information.

For example, a high-resolution headlight system of the motor vehicle, for example a so-called "digital matrix light," can be used as the illumination device. The illumination pattern can be projected by one spotlight or by multiple headlights together. High-resolution headlights can be implemented, for example, on the basis of light-emitting diode matrices or using a switchable mask, such as a liquid crystal matrix. In current headlight systems, particularly high spatial resolutions are achieved through the use of micromirror arrays. In this case, several thousand or even, for example, a million separately switchable solid angle subregions can be present within a headlight cone or an illuminated solid angle region.

The illumination pattern can indicate, for example, for each solid angle subregion whether or not light is to be emitted there. Thus, for example, exactly two different illumination intensities can be possible. This can be advantageous since obstacles or bumps can be detected particularly easily with the aid of distorted light patterns if the light pattern has hard contrasts. However, intermediate intensities could also be used, for example by illuminating the light intensity with a very high frequency beyond human resolution capacity and for example adjusting a pulse width of the illumination. As a result, a light image that is more pleasant for a driver can be generated, for example.

The method according to the present disclosure can only be used in specific driving situations or when specific components are installed in the motor vehicle. For example, it can only be used if a high-resolution headlight system or another suitable illumination device and/or a suitable detection device is installed in the motor vehicle. In addition, it can only be used, for example, if a driver enables the use of the process, for example sets a light switch module to "automatic," a speed is below a specified speed limit, the vehicle is ready to drive, an off-road driving program is active, the road being driven on is classified as "off-road" based on navigation data, or an assistance system signals poor road conditions. It is possible that all of the conditions mentioned, only one of the conditions mentioned, or a subset of the conditions mentioned, which subset does not comprise all conditions, are checked. As will be explained later, the method according to the present disclosure can be used, among other things, to output warning messages to a driver or to parameterize an adaptive chassis. It is therefore possible to carry out the method only if an output means for corresponding notifications, for example a head display or an adaptive chassis, is installed or if automated parameterization of the chassis or a display of corresponding warnings is activated.

On the basis of the detected light pattern, it can be recognized whether a bump and/or an obstacle is located in the solid angle region and/or a recognized bump and/or a recognized obstacle can be assigned a class by a classification algorithm and/or a position of the recognized bump and/or the recognized obstacle can be determined, wherein the selection of the second illumination pattern can depend on the class and/or the position and/or whether a bump and/or an obstacle is located in the solid angle region.

On the basis of the first illumination pattern and the detected light pattern, height information can be determined for portions of a driving plane located in the solid angle region, wherein the recognition and/or classification of the bump and/or the obstacle and/or the determination of the position takes place on the basis of the height information. It is known that when a planar light beam is projected onto an object to be measured, for example the driving plane, an exactly straight line results from the point of view of the illumination device. However, when this line is detected by a detection device offset from the illumination device, a deformed line results, the deformations of which are a measure of the object height. This procedure is known per se as the light section method in the prior art. This procedure can be transferred to any pattern with strong light-dark transitions, as long as individual light-dark transitions in the detected light pattern can be clearly assigned to light-dark transitions in the illumination pattern. If such an unambiguous assignment is not possible in a robust manner, for example because excessive differences in height result in excessive distortions of the pattern, ambiguities can be eliminated, for example, by sequentially illuminating with different illumination patterns and detecting assigned light patterns. This is also known as coded light approach.

With the aid of the mentioned or similar methods, a height profile of the driving plane can thus be extracted from the light pattern. Obstacles or bumps can then be recognized, for example, if the height of a portion is above or below a limit value or if the determined height changes by an amount that exceeds a limit value within a specific length of the driving plane.

Corresponding heights or differences in height can also be evaluated, for example, in order to classify bumps or obstacles. For example, such a classification can be used to determine whether an obstacle can probably be easily driven over, whether driving over is probably only possible under specific limit conditions, for example at low speed or after a corresponding adjustment of the chassis, or whether driving over should generally be avoided.

The position of an obstacle or a bump can, for example, be selected to be the center of that portion which is highest or lowest within the obstacle or bump region, or something similar.

Limit values used in the recognition or classification of obstacles can depend on other parameters, for example on a driving mode used, a chassis setting, or geometric dimensions of the motor vehicle.

While the described determination of height information allows a very robust recognition of obstacles or bumps or their classification and position detection, it would alternatively also be possible, for example, to determine the position, class, or the information as to whether there are any bumps or an obstacle at all, without a previous determination of height information. For example, a measure of a local distortion of the detected light pattern can be determined directly, for example by comparing the detected light pattern with a calculated or previously stored ideal light pattern that would result if the illumination pattern was projected onto a level driving plane.

In at least one selected subregion of the second illumination pattern, the illumination intensity can change more frequently in at least one direction than in the same selected subregion of the first illumination pattern. The frequency of changes in intensity can be viewed as the resolution of a light pattern. For example, the frequency of the changes in intensity can be increased in that, in the case of a line pattern, the number of lines in the selected subregion is higher for the second illumination pattern than for the first illumination pattern. In the case of a grid pattern, for example, the grid constant can be reduced in at least one direction in order to achieve a frequent change in the illumination intensity. If, for example, concentric circles are projected as a pattern, a larger number of circle segments can be imaged locally in the selected subregion. In particular, the first and second illumination patterns can have at least locally periodic changes in intensity. If this is the case, the illumination intensity in the selected subregion can have a higher spatial frequency in the second illumination pattern than in the first illumination pattern.

The frequency increase of the change in the illumination intensity in the subregion can take place in particular if the light pattern is used to recognize that an obstacle or a bump is located in the solid angle region assigned to the subregion.

If this is not the case, the same illumination pattern can continue to be used overall or for the corresponding subregion, or it is also possible to reduce the frequency of changes in the illumination intensity in a subregion for which no presence of an obstacle or bump was recognized.

The selected subregion can be selected on the basis of the position of the recognized bump and/or the recognized obstacle. In particular, the illumination pattern can thus have changes in the illumination intensity in close succession in at least one direction in that region in which a bump or an obstacle or the region surrounding the bump or the obstacle is expected to be illuminated. As a result, the position of the bump or the obstacle can be detected with high accuracy or the automatic recognition and classification of obstacles or bumps can be improved.

Outside of the selected region, the illumination intensity can continue to change with relatively low frequency, so that in particular relatively large-area bumps and obstacles, the height profile of which changes slowly, are illuminated in a way that is easily recognizable for a driver.

The position of the bump or the obstacle can be determined three-dimensionally with respect to the motor vehicle by the light section method already mentioned above or by methods related to it. Edges in the illumination pattern each define a plane, so that an image of such an edge in a specific pixel of the light pattern, which pixel in turn is assigned to a specific solid angle with respect to the detection device, clearly defines a position in three-dimensional space at which the emitted light is scattered or reflected. It is thus possible to select that subregion in order to illuminate it with a pattern with a higher resolution, which pattern illuminates the solid angle subregion of the solid angle region in which the bump or the obstacle is located.

The procedure described can also be repeated iteratively. For example, a further light pattern can be detected, which results from the illumination of the vehicle surrounding with the second illumination pattern. This light pattern can be used, for example, to determine the position of the bump or the obstacle with greater accuracy if a second illumination pattern is used in which the illumination intensity in the relevant region changes with a higher frequency than in the first illumination pattern. A subregion of the second illumination pattern can be selected again on the basis of this more precise position, and a third illumination pattern can then be selected such that the illumination intensity in this further selected subregion changes more frequently than in the second illumination pattern and so on.

The additional light pattern or an additional light pattern that results from the illumination of the vehicle surroundings with the second illumination pattern can be detected by the detection device, wherein at least one parameter of a chassis of the motor vehicle is set and/or notification information is output to a driver of the motor vehicle on the basis of the additional light pattern.

For example, before driving over an obstacle or a bump, ground clearance can be increased by adjusting the chassis, or individual springs can be made harder or softer, for example, in order to allow the bump or obstacle to be driven over without damage.

While the above-explained use of denser light patterns in the region of obstacles or bumps can already be sufficient to inform a driver of corresponding regions, it can also be advantageous to additionally output notification information. In the simplest case, this can take place by an acoustic warning message or, for example, a visual display in an instrument cluster or center display. A visual warning can, for example, also be displayed via a head-up display of the motor vehicle, for example using a corresponding symbol. However, the obstacle or the bump is particularly preferably highlighted using a contact-analog head-up display, so that a corresponding warning, a warning symbol, or the like is displayed in the head-up display in such a way that its display from the driver's perspective overlaps with the obstacle or with the bump. Approaches to the realization of contact-analog head-up displays are known in the prior art and will therefore not be explained in detail.

The first and/or second illumination pattern can be selected in such a way that when the first and/or second illumination pattern is emitted by the illumination device in regions where a flat surface is illuminated, a stripe pattern or a grid pattern or concentric circles result as the light pattern. When using such relatively regular structures as illumination patterns, it is particularly easy for a driver, for example, to recognize a change in the pattern due to bumps or obstacles. Coded light images, defined point patterns, or the like can also be used to recognize obstacles or bumps in the vehicle surroundings based on a change in a projected light pattern.

The illumination device is preferably a headlight of the motor vehicle or comprises at least one headlight of the motor vehicle. For example, headlights can be used that can emit high-resolution light images into the vehicle surroundings. An example of this is the so-called "Digital Matrix Light" which uses a micromirror array to display light patterns. In particular, the illumination device can emit light in the visible spectral range, for example in a range between 380 nm and 780 nm.

In addition to the method according to an embodiment, the embodiment relates to a motor vehicle having an illumination device, a detection device, and a control device, the control device being set up to activate the illumination device according to the method. The control device is preferably also set up to control further components of the motor vehicle, which were discussed above with reference to the method according to an embodiment, in accordance with the method. In general, the features explained with regard to the method can be transferred to the motor vehicle and vice versa, with the advantages mentioned.

Figure 2:
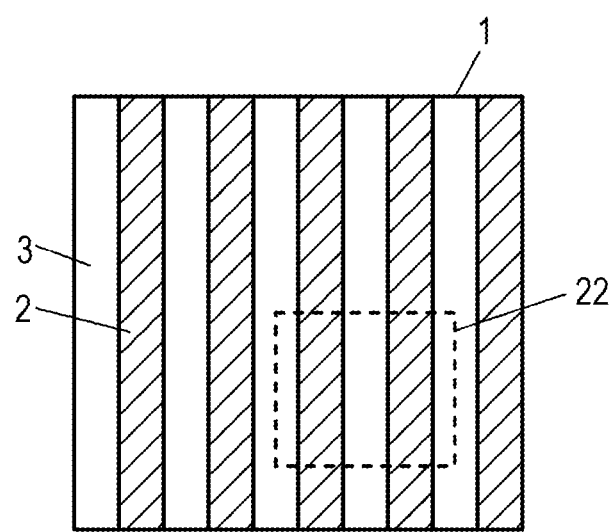
FIG. 2 shows first and second illumination patterns used in the method according to the present disclosure.
Figure 3:
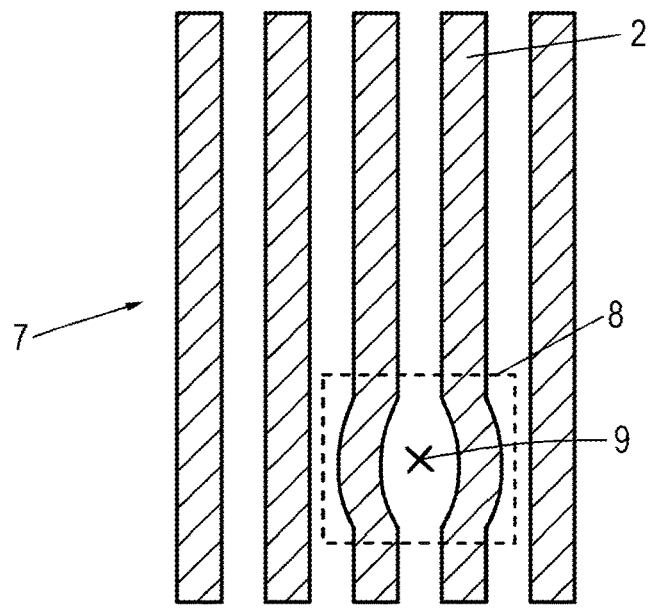
FIG. 3 show light patterns that result in the method from a projection of the illumination patterns shown in FIGS. 2 and 4 in an embodiment of the motor vehicle according to the present disclosure.
Figure 3:
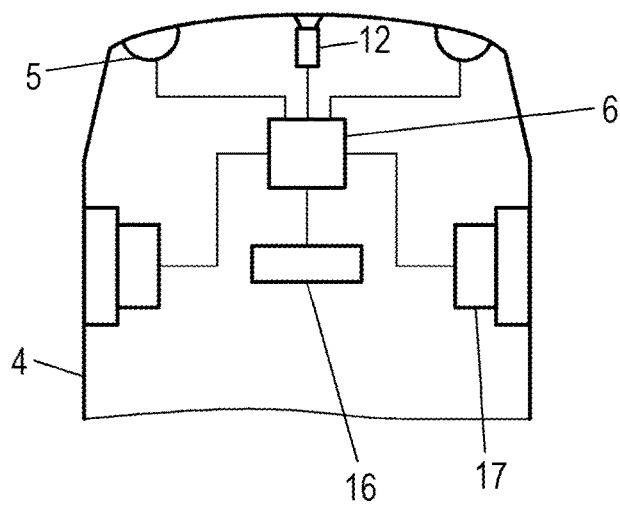
Figure 4:
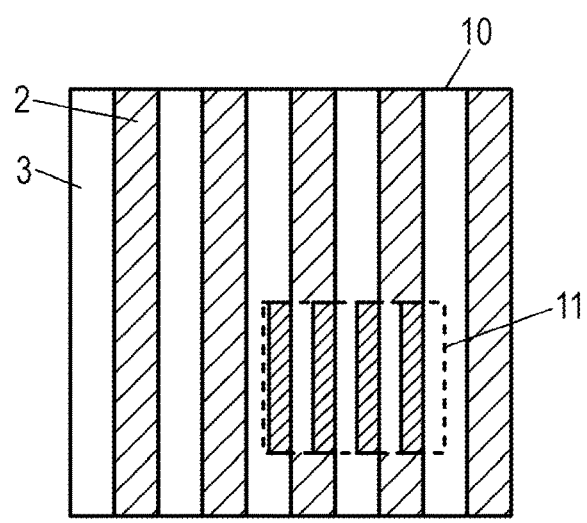
FIG. 4 shows first and second illumination patterns used in the method according to the present disclosure.
Figure 5:
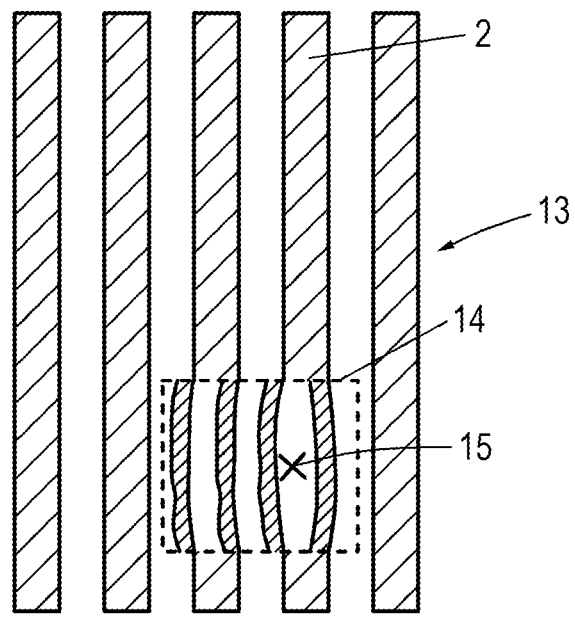
FIG. 5 shows light patterns that result in the method from a projection of the illumination patterns shown in FIGS. 2 and 4 in an embodiment of the motor vehicle according to the present disclosure.
Figure 5:
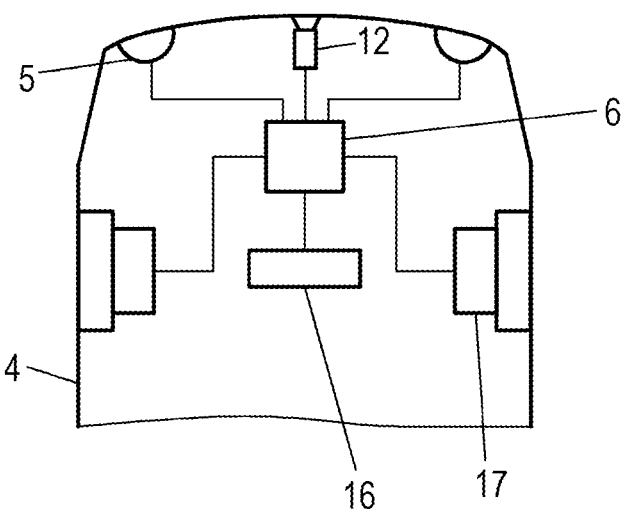
Figure 6:
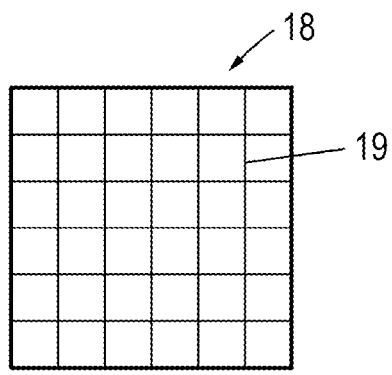
FIG. 6 shows first and second illumination patterns in a further embodiment of the method according to the present disclosure.
Figure 7:
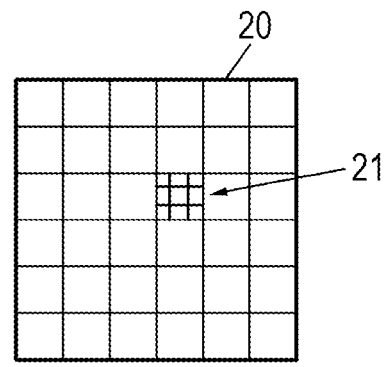
FIG. 7 shows first and second illumination patterns in a further embodiment of the method according to the present disclosure.

Further advantages and details of the present disclosure will become apparent from the following embodiments and the accompanying drawings. Schematically, in the drawings:

FIG. 1 is a flow diagram of an embodiment of the method according to an embodiment, FIGS. 2 and 4 show first and second illumination patterns used in the method, FIGS. 3 and 5 show light patterns that result in the method from a projection of the illumination patterns shown in FIGS. 2 and 4 in an embodiment of the motor vehicle according to an embodiment, and FIGS. 6 and 7 show first and second illumination patterns in a further embodiment of the method according to an embodiment.

FIG. 1 shows a flow chart of a method for illuminating vehicle surroundings of a motor vehicle, the illumination being intended to visibly highlight bumps or obstacles in the vehicle surroundings for a driver and to improve automatic recognition of obstacles or bumps by vehicle-side devices. For this purpose, in step S1, it is first checked whether a precondition is met and whether an illumination of the vehicle surroundings should therefore take place at all with specific patterns in order to highlight obstacles or bumps. This should take place in particular during an off-road operation of the motor vehicle. It can thus be checked, for example, whether a driving program for off-road driving is active and/or navigation data classify a currently driven route as an off-road portion and/or an assistance system indicates poor road conditions. In addition, it can be checked whether a user has enabled a corresponding illuminating mode, for example whether a light switch module is switched to automatic operation. As part of the enabling condition, it can also be checked, for example, whether relevant components for such a method are actually present in the vehicle, for example whether a high-resolution headlight system is installed, a suitable detection device is available, display means for outputting notifications to a driver are available, an adaptive chassis is installed, or the like.

If it was determined in step S1 that illumination of the vehicle surroundings should take place to highlight bumps or obstacles, in step S2, a first illumination pattern 1 which is shown schematically in FIG. 1 is emitted by an illumination device 5, for example a high-resolution headlight, of the motor vehicle 4 which is shown schematically in FIG. 3. The selection or predefinition of the illumination pattern 1 takes place by the control device 6. A simple stripe pattern is used as the illumination pattern 1 by way of example, in which pattern brightly illuminated strips or partial solid angle regions 2 alternate with substantially unilluminated strips or solid angle subregions 3.

If the illumination pattern 1 is projected onto a background which has an obstacle at the position 9, a light pattern 7 which is shown schematically in FIG. 3 results, in which pattern the light strips or the contrast jumps between the differently illuminated solid angle subregions 2, 3 in the region of the obstacle are distorted. As a result, a driver of the motor vehicle 1 can easily recognize corresponding regions based on the distortion of the light pattern 7.

In step S3, the light pattern 7 is detected by a detection device 12 of the motor vehicle, for example a camera. The detected image data is processed by the control device 6 in step S4 in order to recognize relevant obstacles or bumps in the region of the light pattern 7. This is possible, for example, by determining a height profile for portions 8 of a driving plane on the basis of the distortions of the light strips, as has already been explained above. Changes in this height profile beyond a limit value can then be recognized as obstacles or bumps. Alternatively, bumps or obstacles could also be recognized by detecting a deviation of the detected light pattern 7 from a predefined, expected light pattern. In particular, the position 9 of the bump or the obstacle is determined in step S4. Optionally, a bump or an obstacle can also be classified, for example in order to distinguish between obstacles or bumps that can be driven over, obstacles or bumps that can only be driven over under specific conditions, and obstacles or bumps that cannot be driven over.

Since initially a relatively rough stripe pattern is used as the illumination pattern 1, the recognition of bumps or obstacles and in particular a determination of a position or class of the bump or the obstacle is initially relatively imprecise. A second illumination pattern 10 which is shown in FIG. 4 is therefore selected in step S5 on the basis of the detected light pattern 7 and in particular on the basis of the position 9 determined with the aid of said pattern. The second illumination pattern 10 differs from the first illumination pattern 1 in that the illumination intensity in a selected subregion 11 of the second illumination pattern 10 changes more frequently in the transverse direction of FIG. 4 than in the same selected subregion 22 of the first illumination pattern 1. The subregion 11, 22 is selected in such a way that it illuminates the portion 8, 14 of the vehicle surroundings surrounding the position 9 and thus the object or the bump. The frequently changing illumination intensity is realized by using a narrower stripe pattern in the subregion 11. In the example, the illumination intensity in the subregion 11 varies at twice the frequency compared to the subregion 22. As a result, a significantly improved resolution of the scanning of the surroundings is achieved in the transverse direction.

The method is then repeated from step S2, with the second illumination pattern 10 being emitted instead of the first illumination pattern 1, with the result that, as is shown schematically in FIG. 5, a different light pattern 13 also results. Using this light pattern 13, a height profile of the surroundings of the motor vehicle 1 can now be determined again, for example, with a significantly better spatial resolution being able to be achieved in portion 14 due to the narrower stripe pattern. This can result, for example, in a changed position 15 being determined for the obstacle or the bump.

The change in the illumination pattern and in particular the illumination of the surroundings of a relevant position 9, 15 with patterns of increasingly higher resolution can be repeated several times, for example for a specific number of passes, until a resolution limit of the illumination device 5 or the detection device 12 is reached or until a specific convergence criterion is met, for example until position 9, 15 substantially no longer changes as a result of a further change in the illumination pattern.

The emission of the illumination patterns 1, 10 and the light patterns 7, 13 thus visible in front of the motor vehicle makes it easy for a driver to assess the nature of the surface and in particular to recognize obstacles and bumps. On the other hand, automated recognition of obstacles and bumps can be improved. This can be used, for example, to alert a driver to particularly relevant bumps or obstacles, for example bumps or obstacles that should not be driven over, or should only be driven over at low speed. A corresponding notification can be output in step S6. For this purpose, the control device 6 of the motor vehicle 4 can control a notification device 16, for example a head-up display or a center console display. When using a head-up display, the display can in particular take place in a contact-analogous manner which is made possible by the fact that the position 9, 15 of the bump or the obstacle can be recognized with high accuracy.

In addition or as an alternative, it can be expedient for the control device 6 to adapt at least one parameter of a chassis 17 on the basis of the corresponding light pattern 7, 13 that is detected. For example, a height or a class of a bump or an obstacle can indicate that the bump or the obstacle should only be driven over with increased ground clearance. Correspondingly, the chassis 17 of the motor vehicle 4 can be parameterized before the obstacle is reached, for example in order to avoid touching down.

In the previous embodiments, it was assumed that the illumination pattern 1, 10 is a stripe pattern. However, other illumination patterns can also be used. This is explained below purely by way of example using a grid-shaped first illumination pattern 18 which is illustrated in FIG. 6. For reasons of clarity, the brightly illuminated solid angle subregions 19 are only shown as individual lines in FIG. 6. The width of this brightly illuminated solid angle subregion 19 can be selected as required. If the evaluation of the resulting light pattern already explained above reveals that an obstacle to be examined further or a bump to be examined further is located in a specific portion of the light pattern, a second illumination pattern 20 can be selected, as shown in FIG. 7, by adding additional grid lines or brightly illuminated solid angle subregions 19 in a selected subregion 21 and, if necessary, reducing the line width of these grid lines, whereby the illumination intensity in a selected subregion 21 changes more frequently than in the same subregion of the first illumination pattern 18.

The invention claimed is:

1. A method for illuminating vehicle surroundings of a motor vehicle that comprises an illumination device and a detection device, wherein the illumination device is set up to illuminate at least part of a solid angle region of the vehicle surroundings with different illumination patterns, using visible light, wherein the different illumination patterns each predefine illumination intensities for different solid angle subregions of the solid angle region, and wherein the detection device is set up to detect one or more light patterns illuminated with the different illumination patterns, the method comprising:
   illuminating the vehicle surroundings with a first different illumination pattern of the different illumination patterns by the illumination device;
   detecting a first light pattern that results from illumination of the vehicle surroundings with the first different illumination pattern by the detection device;
   selecting a second different illumination pattern of the different illumination patterns on the basis of the detected first light pattern;
   illuminating the vehicle surroundings with the second different illumination pattern by the illumination device;
   detecting a second light pattern that results from the illumination of the vehicle surroundings with the second different illumination pattern by the detection device;
   recognizing on the basis of the detected first light pattern, whether a bump and/or an obstacle is located in the solid angle region and/or a position of the recognized bump and/or the recognized obstacle is determined,
   wherein the selection of the second different illumination pattern depends on the position and/or on whether the recognized bump and/or the recognized obstacle is located in the solid angle region,
   wherein, based on the first different illumination pattern and the detected first light pattern, height information is determined for portions of a driving plane located in the solid angle region to extract a first height profile of the driving plane from the detected first light pattern, and
   wherein the recognition of the bump and/or the obstacle and/or the determination of the position is based on the first height profile;
   determining a second height profile of the driving plane from the detected second light pattern; and
   classifying, by a classification algorithm based on the second height profile, the recognized bump and/or the recognized obstacle into one or more conditions corresponding to at least easily drivable over, unable to be driven over, or only drivable over under specific conditions.

2. The method according to claim 1,
   wherein in at least one selected subregion of the second different illumination pattern, illumination intensity changes more frequently in at least one direction than in a same selected subregion of the first different illumination pattern.

3. The method according to claim 2,
   wherein the at least one selected subregion is selected based on the position of the recognized bump and/or the recognized obstacle.

4. The method according to claim 1,
   wherein at least one parameter of a chassis of the motor vehicle is set and/or notification information is output to a driver of the motor vehicle on the basis of the second light pattern.

5. The method according to claim 1,
   wherein the first and/or second different illumination pattern is selected in such a way that when the first and/or second different illumination pattern is emitted by the illumination device in regions where a flat surface is illuminated, a stripe pattern or a grid pattern or concentric circles result(s) as a light pattern.

6. The method according to claim 1,
   wherein the illumination device comprises at least one headlight of the motor vehicle.

7. A motor vehicle comprising:
   an illumination device, wherein the illumination device is set up to illuminate at least part of a solid angle region of vehicle surroundings with different illumination patterns, using visible light, wherein the different illumination patterns each predefine illumination intensities for different solid angle subregions of the solid angle region;
   a detection device, wherein the detection device is set up to detect one or more light patterns illuminated with the different illumination patterns; and
   a control device, wherein the control device is configured to control the illumination device by:
      illuminating the vehicle surroundings with a first different illumination pattern of the different illumination patterns by the illumination device;
      detecting a first light pattern that results from illumination of the vehicle surroundings with the first different illumination pattern by the detection device;
      selecting a second different illumination pattern of the different illumination patterns on the basis of the detected first light pattern;
      illuminating the vehicle surroundings with the second different illumination pattern by the illumination device;
      detecting a second light pattern that results from the illumination of the vehicle surroundings with the second different illumination pattern by the detection device;
      recognizing on the basis of the detected first light pattern, whether a bump and/or an obstacle is located in the solid angle region and/or a position of the recognized bump and/or the recognized obstacle is determined,
      wherein the selection of the second different illumination pattern depends on the position and/or on whether the recognized bump and/or the recognized obstacle is located in the solid angle region,
      wherein, based on the first different illumination pattern and the detected first light pattern, height information is determined for portions of a driving plane located in the solid angle region to extract a first height profile of the driving plane from the detected first light pattern, and
      wherein the recognition of the bump and/or the obstacle and/or the determination of the position is based on the first height profile;
      determining a second height profile of the driving plane from the detected second light pattern; and
      classifying, by a classification algorithm based on the second height profile, the recognized bump and/or the recognized obstacle into one or more conditions corresponding to at least easily drivable over, unable to be driven over, or only drivable over under specific conditions.

8. The motor vehicle according to claim 7,
wherein in at least one selected subregion of the second different illumination pattern, illumination intensity changes more frequently in at least one direction than in a same selected subregion of the first different illumination pattern.

9. The motor vehicle according to claim 8,
wherein the at least one selected subregion is selected based on the position of the recognized bump and/or the recognized obstacle.

10. The motor vehicle according to claim 7,
wherein at least one parameter of a chassis of the motor vehicle is set and/or notification information is output to a driver of the motor vehicle on the basis of the second light pattern.

11. The motor vehicle according to claim 7,
wherein the first and/or second different illumination pattern is selected in such a way that when the first and/or second different illumination pattern is emitted by the illumination device in regions where a flat surface is illuminated, a stripe pattern or a grid pattern or concentric circles result(s) as a light pattern.

12. The motor vehicle according to claim 7,
wherein the illumination device comprises at least one headlight of the motor vehicle.

* * * * *